June 12, 1962     E. LEHMANN ETAL     3,038,550
AIRCRAFT TOWING OR TRANSPORTING VEHICLE
Filed Sept. 8, 1959     2 Sheets-Sheet 1

INVENTORS
Ernest Lehmann
Seymour C. Yuter

BY

ATTORNEY

June 12, 1962   E. LEHMANN ETAL   3,038,550
AIRCRAFT TOWING OR TRANSPORTING VEHICLE
Filed Sept. 8, 1959                                2 Sheets-Sheet 2

*INVENTORS*
Ernest Lehmann
Seymour C. Yuter

ATTORNEY

United States Patent Office 3,038,550
Patented June 12, 1962

3,038,550
AIRCRAFT TOWING OR TRANSPORTING VEHICLE
Ernest Lehmann, Westhampton, N.Y. (Headquarters 7th Army, Engineering Section, APO 46, New York, N.Y.), and Seymour C. Yuter, Franklin Square, N.Y. (407 Cedar Drive, Briarcliff Manor, N.Y.)
Filed Sept. 8, 1959, Ser. No. 838,499
21 Claims. (Cl. 180—14)

This invention relates to moving apparatus employing prime movers and more particularly to a motor driven chassis for moving objects. The invention is particularly useful for moving vehicles from one position to another position.

Prime movers are self contained units which are often employed to move from place to place a vehicle having its own motive unit whenever it is either undesirable or impossible to use the vehicle's motive unit. Such a situation often arises with aircraft. Aircraft such as airplanes or missiles have a power plant which cannot be used efficiently to move the aircraft a relatively short distance. Accordingly, self-propelled units are used to tow the aircraft to any desired position. The self-propelled unit is coupled to the aircraft and an operator controls the unit to move the aircraft to a desired ground location preparatory to launching or take-off.

In one particular application, these self-propelled units are used to move jet fighter planes from hangars and parking areas to the ready line. A self-propelled unit is rolled under the nose section of the aircraft and a tow bar is coupled to the nose wheel. The operator steers the unit which, in turn, maneuvers the aircraft along the ground. Since the operator is directly in front of the nose of the aircraft while steering the self-propelled unit, his field of vision towards the rear of the aircraft is partially obscured by the body of the plane. Present day aircraft, and particularly jet fighter planes, have short stubby wings that extend laterally from the rear half of the body section, and such wings are often in the region of obscured operator vision. These blind spots limit the operator's ability to maneuver around obstacles such as partially open hangar doors or other parked aircraft. In fact, under emergency conditions great difficulty has been encountered in moving the aircraft from one location to another in a hurry.

Furthermore, the presently used self-propelled units are relatively expensive. Therefore, usually one unit is assigned to a group of aircraft. Thus, when one fighter plane is being moved to the ready line, the remaining planes in the group remain standing in their initial positions. Under alert conditions, such a procedure is dangerous, particularly when warning times are very short.

It is accordingly a general object of the invention to provide improved moving apparatus which minimizes accidents by permitting a greater field of vision.

It is another object of the invention to provide an improved vehicle moving unit which permits rapid and safe maneuvering of the vehicle.

It is a further object of the invention to provide a relatively inexpensive aircraft moving unit so that it is economically feasible to assign one unit to each aircraft or to a small number of aircraft.

In accordance with one embodiment of the invention, moving apparatus is provided having a tow linkage means which extends from one end of the prime mover and is connectable to the vehicle which is to be moved. First and second motion control means laterally extend from the other end of the prime mover for separately controlling the motion of the prime mover.

It should be noted that when the moving apparatus is employed with aircraft, the control units effectively straddle the body of the aircraft. Thus, when separate operators operate each control unit, each operator has a complete view of his side of the aircraft. By providing each with an independent control unit, and particularly a stopping control, the possibility of crashing into obscured objects is greatly diminished.

Since the vehicle moving unit in general is expected to move a vehicle several times its weight, it has been necessary to increase the weight of the moving unit or provide it with treads for increasing traction. The added weight serves no useful function when the unit is not towing an aircraft and the treads introduce an expensive complexity to the steering mechanism. Accordingly, a feature of the invention is the provision of a cradle means which extends from the top of the vehicle moving unit to engage an overhanging portion of the vehicle being towed. For example, when the towed vehicle is an aircraft, the cradle means engages its nose section. The reaction to urging the nose section upward results in the effective adding of weight to the unit to increase its traction.

Further, when an aircraft is on the ready line, it is necessary to supply electrical energy to the aircraft for starting up its engines, since the electrical system of the aircraft derives its electrical current from generators associated with its engines. Thus, a separate power pack is coupled to the aircraft on the ready line to provide the required initial electrical energy. Under alert conditions, there is, therefore, a further time lag before the aircraft can take off. To minimize this time lag, the vehicle moving unit includes a motor generator which in addition to providing power to an electric drive motor includes means for coupling the source of electrical energy to the aircraft so that the aircraft is further serviced for flight while it is being moved to the ready line.

While the invention has been primarily described in connection with apparatus for towing vehicle such as airplanes, it should be noted that other embodiments of the invention are equally useful for carrying any large object from place to place by providing suitable means for supporting the object on the chassis. For example, apparatus in accordance with the invention may be used to carry missiles.

Other objects, features and advantages of the invention will be evident from the following detailed description when read in connection with the accompanying drawings wherein.

Figure 1:
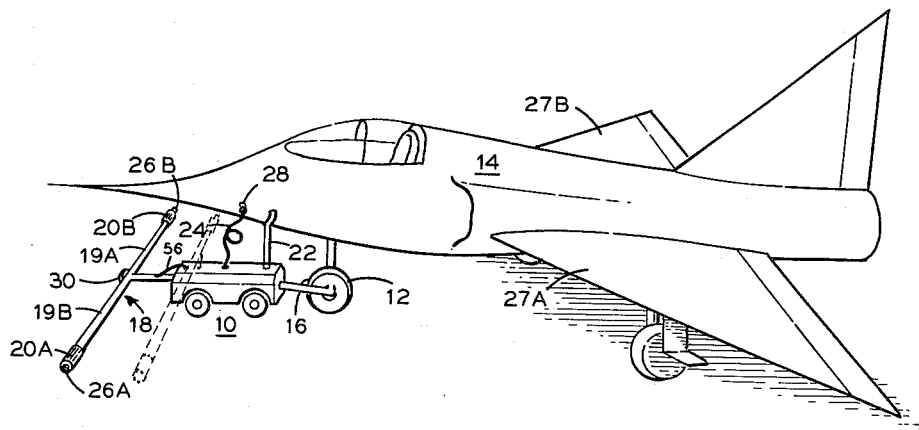
FIGURE 1 shows a vehicle moving unit coupled to an aircraft in accordance with one embodiment of the invention.

Referring to FIGURE 1, a prime mover 10 for moving an aircraft is shown coupled to the nose wheel 12 of a fighter plane 14, in accordance with a specific embodiment of the invention. Extending from the rear of the prime mover 10 is a tow linkage or yoke 16 which provides a readily engageable coupling to the nose wheel 12. A control bar 18 having left and right lateral extensions 19A and 19B, each including respectively an independent control unit 20A and 20B, is connected to the front of the prime mover 10.

To provide added traction when the prime mover 10 is towing the aircraft 14, a hydraulically operated cradle means 22 extends from the top of the prime mover 10 and is adapted to engage the nose section of the fighter plane 14. An electrical cable 24 is further provided to connect the generator in the prime mover 10 to the electrical system of the fighter plane 14 via connector 28 to provide standby electrical power while the aircraft is being brought to the ready line.

During operation, the prime mover 10 is wheeled into position under the nose of the fighter plane 14 by an operator. The yoke 16 is coupled to the nose wheel 12, and the cradle 22 is positioned against the nose section by means of an electrically operated hydraulic pump which is hereinafter more fully described. A pair of operators, each grasping one of the control units 20A and 20B, maneuvers the fighter plane 14 to its desired position. Since the control bar 18 extends laterally beyond the body section of the fighter plane 14, each operator has an unobstructed view of the wings 27A and 27B.

The control units 20A and 20B are basically handle bar grips which when rotated from a neutral position control the speed and direction of the prime mover 10. The greater the rotation from a neutral position, the faster the speed of the prime mover 10, and the direction of rotation of the hand grip causes the prime mover 10 to move in either a forward or reverse direction. Each of the control units 20A and 20B is provided with an optionally lockable normally open pushbutton switch 26A and 26B to cause the prime mover 10 to move. Both of these switches must be in a closed position to move the apparatus. Thus, if either operator wishes to stop the movement of the fighter plane 14, he merely releases pressure on his switch 26. Hence, although both operators have cooperative control in the maneuvering of the fighter plane 14, each operator independently can stop this movement whenever he sees an approaching danger such as the wing 27 on his side of the fighter plane 14 approaching a hangar door. Further, since the control units 20A and 20B are rigidly coupled together, the movement by one operator of one control unit 20 is communicated to the other operator. Thus, when one operator desires to slow down the apparatus, the corresponding movement of his control unit 20 is sensed by the other operator. Whenever, because of a lack of manpower, a single operator is available to steer the prime mover 10, one of the switches 26 is locked in its normally closed position and all control is performed from the other control unit 20.

While the aircraft is being maneuvered, say, to the ready line preparatory to flight, the electrical cable 24 is fitted into the connector 28 and electrical power is available for starting the engines of the fighter plane 14.

Figure 5:
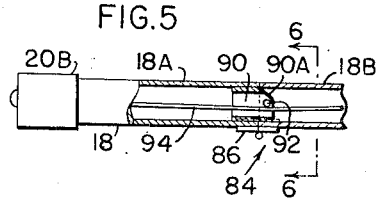
FIGURE 5 is a partly broken away and sectional view of the control bar of FIGURE 3 as modified to permit it to be folded back for storage purposes.
Figure 6:
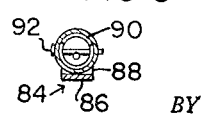
FIGURE 6 is a cross sectional view of the control bar of FIGURE 5 taken along the lines 6—6.

When the fighter plane 14 is in its desired position, one of the operators disengages the cradle 22 by rotating a knob 30 which releases pressure from its associated hydraulic chamber, while the other operator disengages the yoke 16 from the nose wheel 12 and also disconnects the electrical cable 24. The prime mover 10 is then removed from under the nose section of the fighter plane 12 which is now in position for flight. Well known means, such as shown in FIGS. 5 and 6, may be provided for folding the control bar 18 back along each side of the chassis 34 of the prime mover 10 for storing the prime mover 10.

Figure 2:
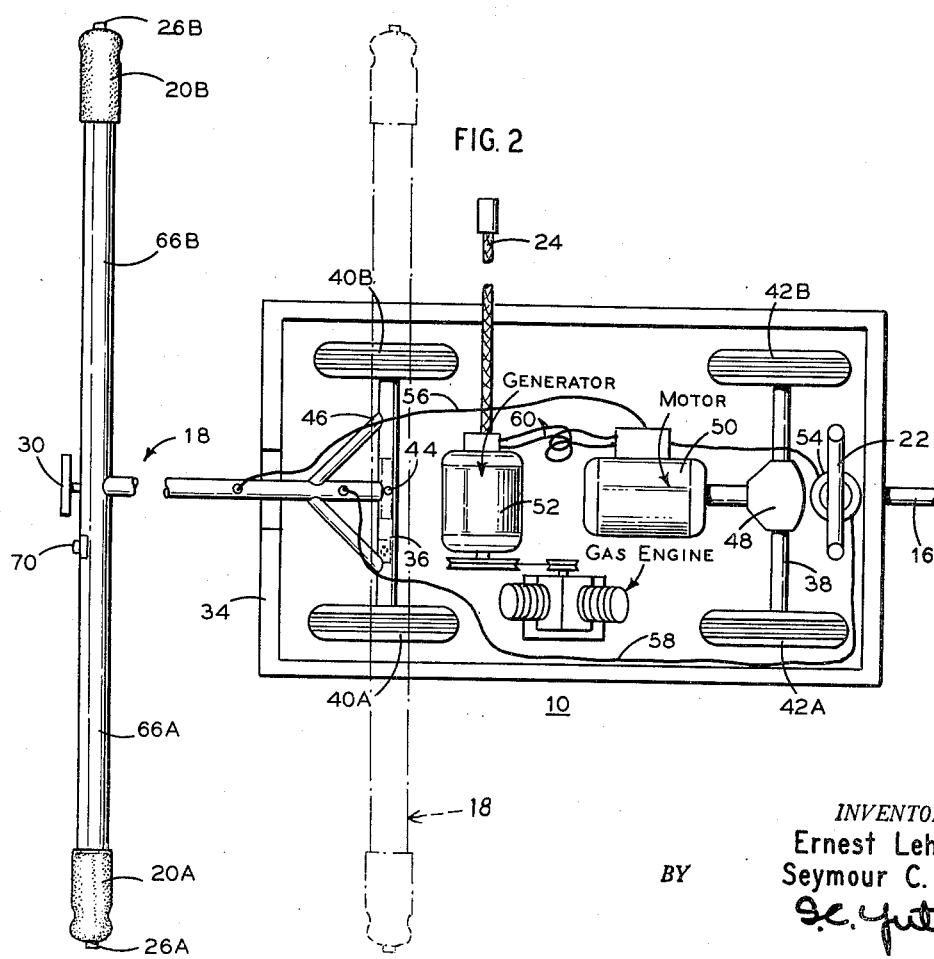
FIGURE 2 is a diagrammatic plan view of the vehicle moving unit of FIGURE 1 with its cover removed.

FIGURE 2 shows the prime mover 10 with its cover removed to more clearly indicate the basic components. The chassis 34 supports a pair of axles 36 and 38. Front wheels 40A and 40B are fixed to the axle 36 in a conventional manner, and the rear wheels 42A and 42B are coupled to the axle 38 (the drive axle). The axle 36, which controls the steering of the front wheels 40A and 40B, is fixed to the chassis 34 via a pin 44 to permit rotation. A yoke extension 46 of the control bar 18 is fixed to the axle 36 to permit steering in the leftward or rightward directions. The control bar 18 may also be mounted directly above and in parallel with the axle 36 as shown in dotted outline in FIGS. 1 and 2. In that case suitable connecting means between the control bar 18 and axle 36 are provided for steering purposes. The axle 38 is coupled via a conventional differential 48 to a direct current electrical motor 50 which receives electrical current from the gasoline operated motor generator 52. An electrically operated hydraulic pump 54 is connected to the cradle 22. The electrical cables 56, 58 and 60 interconnect the several units of the prime mover 10; their function is more fully described hereinafter.

In general, electrical current from the motor generator 52 is controllably fed to the electrical motor 50 which drives the differential 48 to cause rotation of the rear wheels 42A and 42B.

Figure 3:
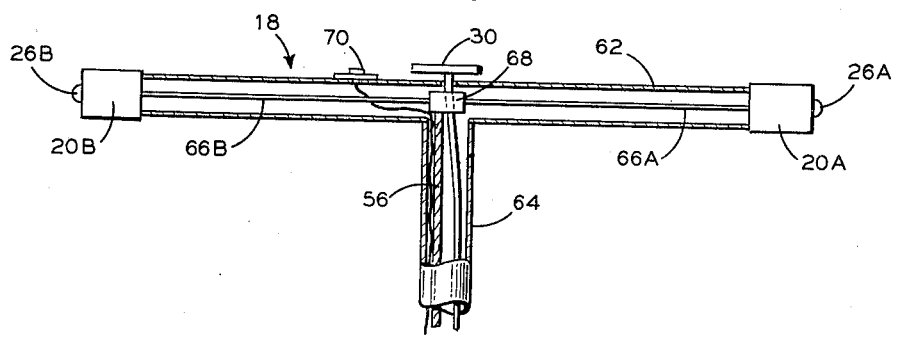
FIGURE 3 is a representation of the control bar of the vehicle moving unit of FIGURES 1 and 2, partly broken away.

The details of the control bar 18 are shown in FIGURE 3. Generally, the control bar 18 comprises a hollow cross-member 62 extending laterally from a shaft 64. Each of the control units 20A and 20B is coupled via rigid shafts 66A and 66B to the moving contact of a potentiometer 68, hereinafter described, which controls the current fed from the motor generator 52 to the electrical motor 50. An axial rotation of the hand grips associated with the control units 20A and 20B positions the moving contact of the potentiometer 68 to control the speed of the prime mover 10. This feature of the invention permits either operator to take over control since the control units 20A and 20B are rigidly coupled together and each opearator can thus know the desire of the other operator by sensing hand grip movement caused by the other. Thus, oral communications are not necessary. The rigid coupling also permits one operator to operate the apparatus from either side. In addition, the pushbutton 70 near the center of the cross member 62 controls the feeding of electrical current to the hydraulic pump 54 which drives the cradle 22. The knob 30, which is connected by a conventional mechanical linkage such as a flexible cable to the valve mechanism in the hydraulic pump 54 permits the bleeding off of hydraulic fluid when the cradle 22 is to be disengaged from the nose section of the fighter plane 14 (FIG. 1).

Figure 4:
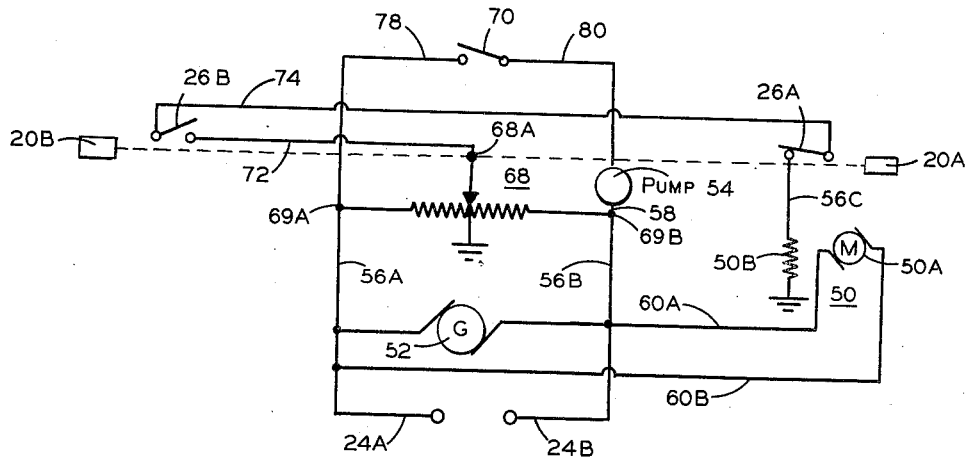
FIGURE 4 is a schematic diagram of the electrical circuitry associated with the vehicle moving unit of FIGURES 1 and 2.

The schematic diagram of FIGURE 4 shows the electrical interconnections of the elements of the prime mover 10. The motor generator 52, when operated, delivers an electrical current via the lines 60A and 60B to the armature windings 50A of the electric motor 50. At the same time, current is delivered via the lines 56A and 56B to the fixed terminals 69A and 69B of potentiometer 68. It should be noted that potentiometer 68 has a grounded center tap so that current flowing from the moving contact 68A has alternate directions depending upon its position. Thus, since the moving contact 68A is mechanically coupled to the control units 20A and 20B, their clockwise or counterclockwise rotation determines the direction of the flow of current through the moving contact 68A. The moving contact 68A is coupled via the line 72, switch 26B, line 74, switch 26A and line 56C, to the field windings 50B of the electric motor 50.

The normally open switches 26A and 26B are normally open spring-return switches which are interposed in series between the moving contact 68A of the potentiometer 68 and the field winding 50B of the motor 50. Therefore, unless both switches 26A and 26B are closed, current cannot flow to the field winding 50B and the motor 50 is at a standstill. When both switches 26A and 26B are closed, for example when each operator depresses his switch 26 during the maneuvering operation, or when one of the switches 26A and 26B is permanently locked and a single operator depresses the other switch 26, current flows to the field winding 50B.

The direction of current in the field winding determines the direction of rotation of the motor 50. Thus, by moving the moving contact 68A to either side of the grounded center tap, the direction of current flowing to the field winding is determined. This determination, as previously stated, is accomplished by the direction of rotation of the control units 20A and 20B.

In addition to the above described controlled circuitry, there is included the previously mentioned normally open push button switch 70 which is interposed between the electrical motor of hydraulic pump 54 and the output of the motor generator 52. When the switch 70 is closed, current flows via the lines 78 and 80 to activate the hydraulic pump 54 which moves the cradle 22 (FIG. 1) against the nose section of the fighter plane 14. Thus, when the cradle 22 is to be engaged, one of the operators closes the switch 70 until the cradle is in position and then opens the switch 70 to prevent any possible damage to the aircraft.

Further, to provide electrical power for the aircraft, the previously described cable 24 comprising the leads 24A and 24B may be used to connect the motor generator 52 to the connector 28 in the fighter plane.

Each extending half of the control bar 18 may be folded back along the body of the towing vehicle by means of the modified construction of the control bar 18 employing the hinge means 84 as shown in FIGS. 5 and 6. Hinge means 84 comprises the hinge 86 which is fastened to the control bar 18 via the yoke 88. The control bar 18 has two physically separate sections 18A and 18B which are respectively fastened to the two leaves of the hinge 86. A sleeve 90 is fastened within the control bar 18 and bridges sections 18A and 18B. Sleeve 90 has a recessed portion 90A which permits the sleeve 90 to clear the control bar 18 when it is folded back along the body of the towing vehicle. Pin 92 is provided to maintain sections 18A and 18B in locked position when the control bar 18 is in the operating position. A locking pin may be provided at the end of the pin 90 to prevent it from accidentally being withdrawn. The rigid shafts 66A and 66B (FIG. 3) are replaced by flexible coupling cable 94 which may be flexible control cable similar to speedometer cable.

There has thus been shown an improved aircraft moving unit (prime mover) which by providing a greater field of vision to the operators, permits a more rapid and safer maneuvering of a grounded aircraft. One vehicle moving unit, since it is relatively inexpensive, can be assigned to a single aircraft.

Associated with the vehicle moving unit is a source of eelctrical power which permits the flight servicing of the aircraft while it is being moved to the ready line. There has further been shown a cradle means which, when employed with a relatively light prime mover, still affords a large amount of traction while the unit is being employed to move an aircraft.

Another important use for the invention is to carry rather than tow objects. Thus by providing suitable well known supporting means on the chassis 34, large objects such as missiles may be carried.

There will now be obvious to those skilled in the art, many modifications and variations of the described moving apparatus which do not depart from the spirit of the invention as disclosed in the claims which follow.

What is claimed is:

1. In a towing vehicle of the kind that is placed in substantially central longitudinal axial alignment with a thereto linkable subject vehicle to be towed, said towing vehicle being provided with a wheel-and-axle combination that is rotatable in a horizontal plane to permit turning motion of both said vehicles in either direction as well as straight line motion, apparatus for controlling movement of said vehicles comprising a transverse control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed towards either free end of said control bar an unobstructed view of an area which view would be obstructed by said subject vehicle were such operator stationed approximately at said central longitudinal axis to control movement of said vehicles, a variable speed electric motor for imparting motion to said towing vehicle, and electromechanical motor speed control means operable from either free end of said control bar by an operator stationed thereat for continuously varying the motor speed, and consequently the speed of motion of said vehicles, from standstill to a maximum speed.

2. In a towing vehicle of the kind that is placed in substantially central longitudinal axial alignment with a thereto linkable subject vehicle to be towed, said towing vehicle being provided with a wheel-and-axle combination that is rotatable in a horizontal plane to permit turning motion of both said vehicles in either direction as well as straight line motion, apparatus for controlling movement of said vehicles comprising a transverse control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed towards either free end of said control bar an unobstructed view of an area which view would be obstructed by said subject vehicle were such operator stationed approximately at said central longitudinal axis to control movement of said vehicles, a variable speed electric motor for imparting motion to said towing vehicle, electromechanical motor speed control means operable from either free end of said control bar by an operator stationed thereat for continuously varying the motor speed, and consequently the speed of motion of said vehicles, from standstill to a maximum speed, and switching means also operable from either free end of said control bar by an operator stationed thereat for instantly starting and stopping said motor and consequently said vehicles.

3. In a towing vehicle of the kind that is placed in substantially central longitudinal axial alignment with a thereto linkable subject vehicle to be towed, said towing vehicle being provided with a wheel-and-axle combination that is rotatable in a horizontal plane to permit turning motion of both said vehicles in either direction as well as straight line motion, apparatus for controlling movement of said vehicles comprising a transverse control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed towards either free end of said control bar an unobstructed view of an area which view would be obstructed by said subject vehicle were such operator stationed approximately at said central longitudinal axis to control movement of said vehicles, a bidirectional variable speed electric motor for imparting motion to said towing vehicle, and electromechanical motor speed control means operable from either free end of said control bar by an operator stationed thereat for continuously varying the motor speed, and consequently the speed of motion of said vehicles, from standstill to a maximum speed, in either direction to permit forward and reverse motion of said vehicles.

4. In a towing vehicle of the kind that is placed in substantially central longitudinal axial alignment with a thereto linkable subject vehicle to be towed, said towing vehicle being provided with a wheel-and-axle combination that is rotatable in a horizontal plane to permit turning motion of both said vehicles in either direction as well as straight line motion, apparatus for controlling movement of said vehicles comprising a transverse control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed towards either free end of said control bar an unobstructed view of an area which view would be obstructed by said subject vehicle were such operator stationed approximately at said central longitudinal axis to control movement of said vehicles, a bidirectional variable speed electric motor for imparting motion to said towing vehicle, electromechanical motor speed control means operable from either free end of said control bar by an operator stationed thereat for continuously varying the motor speed, and consequently the speed of motion of said vehicles, from standstill to a maximum speed, in either direction to permit forward and reverse motion of said vehicles, and switching means also operable from either free end of said control bar by an operator stationed thereat for instantly starting and stopping said motor and consequently said vehicles.

5. In a towing vehicle of the kind that is placed in substantially central longitudinal axial alignment with a thereto linkable subject vehicle to be towed, said towing vehicle being provided with a wheel-and-axle combination that is rotatable in a horizontal plane to permit turning motion of both said vehicles in either direction as well as straight line motion, apparatus for controlling movement of said vehicles comprising a transverse control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed towards either free end of said control bar an unobstructed view of an area which view would be obstructed by said subject vehicle were such operator stationed approximately at said central longitudinal axis to control movement of said vehicles, a bidirectional variable speed electric motor for imparting motion to said towing vehicle, electromechanical motor speed control means operable from either free end of said control bar by an operator stationed thereat for continuously varying the motor speed, and consequently the speed of motion of said vehicles, from standstill to a maximum speed, in either direction to permit forward and reverse motion of said vehicles, and switching means also operable from either free end of said control bar by an operator stationed thereat for instantly starting and stopping said motor and consequently said vehicles, said electromechanical means adapted to indicate to an operator stationed at one of the free ends of said control bar that an operator stationed at the other free end is operating said electromechanical means to vary the speed of said motor without necessity of oral communication.

6. In a towing vehicle of the kind that is placed in substantially central longitudinal axial alignment with a thereto linkable subject vehicle to be towed, said towing vehicle being provided with a wheel-and-axle combination that is rotatable in a horizontal plane to permit turning motion of both said vehicles in either direction as well as straight line motion, apparatus for controlling movement of said vehicles comprising a transverse hollow control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed towards either free end of said control bar an unobstructed view of an area which view would be obstructed by said subject vehicle were such operator stationed approximately at said central longitudinal axis to control movement of said vehicles, a variable speed electric motor for imparting motion to said towing vehicle, and electromechanical motor speed control means operable from either free end of said control bar by an operator stationed thereat for continuously varying the motor speed, and consequently the speed of motion of said vehicles, from standstill to a maximum speed, said electromechanical means comprising a member disposed within said control bar and substantially coextesnive therewith, an actuating element for operating said member at each free end of said control bar by an operator stationed thereat, a potentiometer having a movable slider that is in driven relation to said member, and means for energizing said potentiometer, said motor having a field winding that is connected in circuit with said potentiometer slider for receiving a variable motor field excitation current in accordance with the position of said slider as determined by the extent of actuation of said member to control the motor speed.

7. In a towing vehicle of the kind that is placed in substantially central longitudinal axial alignment with a thereto linkable subject vehicle to be towed, said towing vehicle being provided with a wheel-and-axle combination that is rotatable in a horizontal plane to permit turning motion of both said vehicles in either direction as well as straight line motion, apparatus for controlling movement of said vehicles comprising a transverse hollow control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed towards either free end of said control bar an unobstructed view of an area which view would be obstructed by said subject vehicle were such operator stationed approximately at said central longitudinal axis to control movement of said vehicles, a variable speed electric motor for imparting motion to said towing vehicle, and electro-mechanical motor speed control means operable from either free end of said control bar by an operator stationed thereat for continuously varying the motor speed, and consequently the speed of motion of said vehicles, from standstill to a maximum speed, said electromechanical means comprising a member disposed within said control bar and substantially coextensive therewith, an actuating element for operating said member at each free end of said control bar by an operator stationed thereat, a potentiometer having a movable slider that is in driven relation to said member, and means for energizing said potentiometer, said motor having a field winding that is connected in circuit with said potentiometer slider for receiving a variable motor field excitation current in accordance with the position of said slider as determined by the extent of actuation of said member to control the motor speed.

8. In a towing vehicle of the kind that is placed in substantially central longitudinal axial alignment with a thereto linkable subject vehicle to be towed, said towing vehicle being provided with a wheel-and-axle combination that is rotatable in a horizontal plane to permit turning motion of both said vehicles in either direction as well as straight line motion, apparatus for controlling movement of said vehicles comprising a transverse hollow control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed towards either free end of said control bar an unobstructed view of an area which view would be obstructed by said subject vehicle were such operator stationed approximately at said central longtudinal axis to control movement of said vehicles, a bidirectional variable speed electric motor for imparting motion to said towing vehicle, and electromechanical motor speed control means operable from either free end of said control bar by an operator stationed thereat for continuously varying the motor speed, and consequently the speed of motion of said vehicles, from standstill to a maximum speed, in either direction to permit forward and reverse motion of said vehicles, said electromechanical means comprising a member disposed within said control bar and substantially coextensive therewith, an actuating element for operating said member at each free end of said control bar by an operator stationed thereat, a potentiometer having a movable slider that is in driven relation to said member, and means for energizing said potentiometer, said motor having a field winding that is connected in circuit with said potentiometer slider for receiving a variable motor field excitation current in accordance with the position of said slider as determined by the extent of actuation of said member to control the motor speed.

9. In a towing vehicle of the kind that is placed in substantially central longitudinal axial alignment with a thereto linkable subject vehicle to be towed, said towing vehicle being provided with a wheel-and-axle combination that is rotatable in a horizontal plane to permit turning motion of both said vehicles in either direction as well as straight line motion, apparatus for controlling movement of said vehicles comprising a transverse hollow control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed towards either free end of said control bar an unobstructed view of an area which view would be obstructed by said subject vehicle were such operator stationed approximately at said central longitudinal axis to control movement of said vehicles, a bidirectional variable speed electric motor for imparting motion to said towing vehicle, electromechanical motor speed control means operable from either free end of said control bar by an operator stationed thereat for continuously varying the motor speed, and consequently the speed of motion of said vehicles, from standstill to a maximum speed, in either direction to permit forward and reverse motion of said vehicles, and switching means also operable from either free end of said control bar by an operator stationed thereat for instantly starting and stopping said motor and consequently said vehicles, said electromechanical means comprising a member disposed within said control bar and substantially coextensive therewith, an actuating element for operating said member at each free end of said control bar by an operator stationed thereat, a potentiometer having a movable slider that is in driven relation to said member, and means for energizing said potentiometer, said motor having a field winding that is connected in circuit with said potentiometer slider for receiving a variable motor field excitation current in accordance with the position of said slider as determined by the extent of actuation of said member to control the motor speed.

10. In a towing vehicle of the kind that is placed in substantially central longitudinal axial alignment with a thereto linkable subject vehicle to be towed, said towing vehicle being provided with a wheel-and-axle combination that is rotatable in a horizontal plane to permit turning motion of both said vehicles in either direction as well as straight line motion, apparatus for controlling movement of said vehicles comprising a transverse hollow control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed towards either free end of said control bar an unobstructed view of an area which view would be obstructed by said subject vehicle were such operator stationed approximately at said central longitudinal axis to control movement of said vehicles, a variable speed electric motor for imparting motion to said towing vehicle, and electromechanical motor speed control means operable from either free end of said control bar by an operator stationed thereat for continuously varying the motor speed, and consequently the speed of motion of said vehicles, from standstill to a maximum speed, said electromechanical means comprising a rotatable member disposed within said control bar and substantially coextensive therewith, an actuating element for rotating said member at each free end of said control bar by an operator stationed thereat, a potentiometer having a movable slider that is in driven relation to said member, and means for energizing said potentiometer, said motor having a field winding that is connected in circuit with said potentiometer slider for receiving a variable motor field excitation current in accordance with the position of said slider as determined by the extent of rotation of said member to control the motor speed.

11. In a towing vehicle of the kind that is placed in substantially central longitudinal axial alignment with a thereto linkable subject vehicle to be towed, said towing vehicle being provided with a wheel-and-axle combination that is rotatable in a horizontal plane to permit turning motion of both said vehicles in either direction as well as straight line motion, apparatus for controlling movement of said vehicles comprising a transverse hollow control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed towards either free end of said control bar an unobstructed view of an area which view would be obstructed by said subject vehicle were such operator stationed approximately at said central longitudinal axis to control movement of said vehicles, a variable speed electric motor for imparting motion to said towing vehicle, and electromechanical motor speed control means operable from either free end of said control bar by an operator stationed thereat for continuously varying the motor speed, and consequently the speed of motion of said vehicles, from standstill to a maximum speed, said electromechanical means comprising a rotatable member disposed within said control bar and substantially coextensive therewith, an actuating element for rotating said member at each free end of said control bar by an operator stationed thereat, a potentiometer having a movable slider that is in driven relation to said member, and means for energizing said potentiometer, said motor having a field winding that is connected in circuit with said potentiometer slider for receiving a variable motor field excitation current in accordance with the position of said slider as determined by the extent of rotation of said member to control the motor speed.

12. In a towing vehicle of the kind that is placed in substantially central longitudinal axial alignment with a thereto linkable subject vehicle to be towed, said towing vehicle being provided with a wheel-and-axle combination that is rotatable in a horizontal plane to permit turning motion of both said vehicles in either direction as well as straight line motion, apparatus for controlling movement of said vehicles comprising a transverse hollow control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed towards either free end of said control bar an unobstructed view of an area which view would be obstructed by said subject vehicle were such operator stationed approximately at said central longitudinal axis to control movement of said vehicles, a bidirectional variable speed electric motor for imparting motion to said towing vehicle, and electromechanical motor speed control means operable from either free end of said control bar by an operator stationed thereat for continuously varying the motor speed, and consequently the speed of motion of said vehicles, from standstill to a maximum speed, in either direction to permit forward and reverse motion of said vehicles, said electromechanical means comprising a rotatable member disposed within said control bar and substantially coextensive therewith, an actuating element for rotating said member at each free end of said control bar by an operator stationed thereat, a potentiometer having a movable slider that is in driven relation to said member, and means for energizing said potentiometer, said motor having a field winding that is connected in circuit with said potentiometer slider for receiving a variable motor field excitation current in accordance with the position of said slider as determined by the extent of rotation of said member to control the motor speed.

13. In a towing vehicle of the kind that is placed in substantially central longitudinal axial alignment with a thereto linkable subject vehicle to be towed, said towing vehicle being provided with a wheel-and-axle combination that is rotatable in a horizontal plane to permit turning motion of both said vehicles in either direction as well as straight line motion, apparatus for controlling movement of said vehicles comprising a transverse hollow control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed towards either free end of said control bar an unobstructed view of an area which view would be obstructed by said subject vehicle were such operator stationed approximately at said central longitudinal axis to control movement of said vehicles, a bidirectional variable speed electric motor for imparting motion to said towing vehicle, electromechanical motor speed control means operable from either free end of said control bar by an operator stationed thereat for continuously varying the motor speed, and consequently the speed of motion of said vehicles, from standstill to a maximum speed, in either direction to permit forward and reverse motion of said vehicles, and switching means also operable from either free end of said control bar by an operator stationed thereat for instantly starting and stopping said motor and consequently said vehicles, said electromechanical means comprising a rotatable member disposed within said control bar and substantially coextensive therewith, an actuating element for rotating said member at each free end of said control bar by an operator stationed thereat, a potentiometer having a movable slider that is in driven relation to said member, and means for energizing said potentiometer, said motor having a field winding that is connected in circuit with said potentiometer slider for receiving a variable motor field excitation current in accordance with the position of said slider as determined by the extent of rotation of said member to control the motor speed.

14. Apparatus according to claim 13, wherein the switching means comprises a switch located towards each free end of the control bar and operable by an operator stationed thereat to open and closed positions for energizing the motor in one combination of switch positions and for deenergizing the motor in another combination of switch positions.

15. Apparatus according to claim 13, wherein the switching means comprises a normally open switch located towards each free end of the control bar and closeable by an operator stationed thereat to energize the motor upon closure of both switches, at least one of said switches being lockable in the closed position to permit optional operation of the towing vehicle by but a single operator stationed at that free end of said control bar which is provided with the other switch.

16. In an aircraft towing vehicle of the kind that is placed in substantially central longitudinal axial alignment with a thereto linkable subject aircraft vehicle to be towed and linked to the nose wheel of said aircraft, said towing vehicle being provided with a wheel-and-axle combination that is rotatable in a horizontal plane to permit turning motion of both said vehicles in either direction as well as straight line motion, apparatus for controlling movement of said vehicles comprising a transverse hollow control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed towards either free end of said control bar an unobstructed view of an area which view would be obstructed by a wing of said subject vehicle were such operator stationed approximately at said central longitudinal axis to control movement of said vehicles, a bidirectional variable speed electric motor for imparting motion to said towing vehicle, electromechanical motor speed control means operable from either free end of said control bar by an operator stationed thereat for continuously varying the motor speed, and consequently the speed of motion of said vehicles, from standstill to a maximum speed, in either direction to permit forward and reverse motion of said vehicles, and switching means also operable from either free end of said control bar by an operator stationed thereat for instantly starting and stopping said motor and consequently said vehicles, said electromechanical means comprising a rotatable member disposed within said control bar and substantially coextensive therewith, an actuating element for rotating said member at each free end of said control bar by an operator stationed thereat, a potentiometer having a movable slider that is in driven relation to said member, and means for energizing said potentiometer, said motor having a field winding that is connected in circuit with said potentiometer slider for receiving a variable motor field excitation current in accordance with the position of said slider as determined by the extent of rotation of said member to control the motor speed, and said switching means comprising a normally open switch located towards each free end of the control bar and closeable by an operator stationed thereat to energize the motor upon closure of both switches, at least one of said switches being lockable in the closed position to permit optional operation of the towing vehicle by but a single operator stationed at that free end of said control bar which is provided with the other switch.

17. In an electromechanically self-propelled vehicle for transporting large objects, said vehicle being provided with a wheel and axle combination that is rotatable in a horizontal plane to permit turning motion of said vehicle as well as straight line motion, apparatus for controlling movement of said vehicle comprising a transverse control bar coupled to said wheel-and-axle combination substantially in the plane of said central longitudinal axis for steering said towing vehicle to produce said turning and straight line motions, said control bar extending laterally of said central longitudinal axis to substantial length in both directions to afford an operator stationed toward either free end of said control bar an unobstructed view of an area which view would otherwise be obstructed by said objects were such operator stationed approximately at said central longitudinal axis to control movement of said vehicle, a bidirectional variable speed electric motor for imparting motion to said vehicle, electromechanical motor speed control means operable from either free end of said control bar by an operator stationed thereat for continuously varying the motor speed, and consequently the speed of motion of said vehicle, from standstill to a maximum speed, in either direction to permit forward and reverse motion of said vehicle, and switching means also operable from either free end of said control bar by an operator stationed thereat for instantly starting and stopping said motor and consequently said vehicle.

18. In a towing device of the kind that is placed in substantially central longitudinal axial alignment with a thereto linkable subject vehicle to be towed, said towing device being provided with a body, apparatus for controlling movement of said vehicles comprising a transverse control means coupled to said body for steering said towed vehicle to produce turning and straight line motions, said transverse control means extending laterally of said central longitudinal axis to substantial length in both directions to afford an operator stationed towards either free end of said transverse control means an unobstructed view of an area which view would be obstructed by said subject vehicle were such operator stationed approximately at said central longitudinal axis to control movement of said towed vehicle, a variable speed moving means for imparting motion to said towed vehicle, and speed control means operable from either free end of said transverse control means by an operator stationed thereat for continuously varying the speed of said moving means, and consequently the speed of motion of said towed vehicle, from standstill to a maximum speed.

19. The towing vehicle of claim 1 including a motor generator for generating electrical energy and means for coupling said motor generator to the electrical system of the towed vehicle.

20. The towing device of claim 19 including cradle means extending from said body and means for positioning said cradle means against the body of the towed vehicle.

21. The towing device of claim 18 including a motor generator for generating electrical energy, means for coupling said motor generator to said electric motor and means for coupling said motor generator to the electrical system of the towed device.

References Cited in the file of this patent

UNITED STATES PATENTS

| | | |
|---|---|---|
| 1,129,954 | Carr | Mar. 2, 1915 |
| 2,409,552 | Donnellan | Oct. 15, 1946 |
| 2,417,613 | Radabaugh | Mar. 18, 1947 |
| 2,601,752 | Rose | July 1, 1952 |
| 2,732,088 | Arnot | Jan. 24, 1956 |
| 2,773,703 | Ferguson | Dec. 11, 1956 |
| 2,846,018 | Puckett | Aug. 5, 1958 |
| 2,949,972 | Wirkkala | Aug. 23, 1960 |

FOREIGN PATENTS

| | | |
|---|---|---|
| 600,130 | Great Britain | Apr. 1, 1948 |